US012097548B2

(12) United States Patent
Busuttil

(10) Patent No.: US 12,097,548 B2
(45) Date of Patent: Sep. 24, 2024

(54) APPARATUS AND METHODS FOR FORMING AN ATTACHMENT PAD IN HIGH STRENGTH STEEL MATERIALS

(71) Applicant: KUKA Systems North America LLC, Sterling Heights, MI (US)

(72) Inventor: Peter L. Busuttil, Troy, MI (US)

(73) Assignee: KUKA Systems North America LLC, Sterling Heights, MI (US)

(*) Notice: Subject to any disclaimer, the term of this patent is extended or adjusted under 35 U.S.C. 154(b) by 89 days.

(21) Appl. No.: 17/397,456

(22) Filed: Aug. 9, 2021

(65) Prior Publication Data

US 2023/0042057 A1 Feb. 9, 2023

(51) Int. Cl.
*B21D 22/02* (2006.01)
*B29C 65/00* (2006.01)

(52) U.S. Cl.
CPC ............ *B21D 22/022* (2013.01); *B29C 66/83* (2013.01)

(58) Field of Classification Search
CPC .... B21D 22/022; B21D 22/208; B21D 37/16; B29C 66/83; B25J 11/007; B21J 15/105; B21J 15/386
USPC ...................................................... 72/342.94
See application file for complete search history.

(56) References Cited

U.S. PATENT DOCUMENTS

| | | | |
|---|---|---|---|
| 3,815,395 A * | 6/1974 | Sass ........................ | B21D 22/18 72/342.1 |
| 4,438,971 A | 3/1984 | Zaydel et al. | |
| 6,417,490 B1 * | 7/2002 | Liebrecht ............... | B21J 15/025 219/157 |
| 7,100,260 B2 | 9/2006 | Savoy et al. | |
| 7,117,706 B2 | 10/2006 | Savoy | |
| 8,234,770 B2 * | 8/2012 | Durandet ............... | B23K 26/60 29/525.01 |
| 8,561,450 B2 * | 10/2013 | Lee .......................... | C21D 9/46 72/405.09 |
| 9,259,774 B2 * | 2/2016 | Carter .................. | B21D 39/031 |
| 9,815,109 B2 | 11/2017 | Savoy et al. | |

(Continued)

FOREIGN PATENT DOCUMENTS

| | | | | |
|---|---|---|---|---|
| DE | 19630488 A1 * | 1/1998 | ........... | B21D 39/031 |
| WO | 2014/123428 A1 | 8/2014 | | |

OTHER PUBLICATIONS

KR 20110035697A, Lee et al. Apr. 2011.*

(Continued)

*Primary Examiner* — Edward T Tolan
(74) *Attorney, Agent, or Firm* — Dorton & Willis, LLP

(57) ABSTRACT

A tool and associated method for forming an attachment pad on a sheet material made from high strength steel. The tool includes a housing, an anvil supported on the housing and defining a working axis for forming the pad, and a slide block supported on the housing for movement at least along the working axis of the anvil. A die block is supported on the housing opposite the slide block, and is movable in directions along the working axis. The die block cooperates with anvil to form the pad at a target location defined along the working axis. The tool further includes a heating device supported for movement to and between first and second positions relative to the target location. The first position is adjacent to and aligned with the target location, while the second position is displaced from the first position and away from the target location.

11 Claims, 2 Drawing Sheets

(56) References Cited

U.S. PATENT DOCUMENTS

| | | |
|---|---|---|
| 2004/0134968 A1 | 7/2004 | Opper |
| 2009/0199614 A1 | 8/2009 | Widdel et al. |
| 2010/0328820 A1* | 12/2010 | Chen .................... G11B 5/4826 |
| | | 72/364 |
| 2012/0018422 A1* | 1/2012 | Bohner ................ B21D 22/022 |
| | | 219/602 |
| 2012/0111161 A1* | 5/2012 | Kuriki .................... B23K 26/38 |
| | | 83/16 |
| 2015/0231680 A1* | 8/2015 | Jones .................... H05B 6/103 |
| | | 72/18.2 |
| 2018/0250734 A1 | 9/2018 | Savoy et al. |
| 2019/0105700 A1* | 4/2019 | Jimbo .................. C22C 38/002 |

OTHER PUBLICATIONS

U.S. Patent Office; Search Report and Written Opinion in related International Patent Application No. PCT/US22/35193 dated Nov. 1, 2022; 11 pages.

* cited by examiner

APPARATUS AND METHODS FOR FORMING AN ATTACHMENT PAD IN HIGH STRENGTH STEEL MATERIALS

TECHNICAL FIELD

The present invention relates generally to the automated assembly of components and, more particularly, to apparatus and methods for forming attachment pads in high strength steel sheet materials to facilitate joining component parts of an assembly.

BACKGROUND

Robotic manipulators and other computer-controlled machines are increasingly used to automate the assembly of component parts into an end product. As a non-limiting example, the manufacture of automobiles is conventionally accomplished using assembly lines having an increasing number of assembly processes and operations performed by automated machinery. U.S. Pat. No. 7,117,706 to Savoy discloses a tool that can be supported on a multi-axis industrial robotic manipulator for forming attachment pads in sheet material, such as automotive body panels, to facilitate joining component parts to the panels during automated assembly. While the tool disclosed in U.S. Pat. No. 7,117,706 is suitable for forming pads in mild steel, which is generally very ductile, the tool is not suitable for forming attachment pads in high strength sheet metal, such as high strength alloy steels, because these materials are generally not well suited to cold forming.

A trend in the manufacturing industry, particularly in the automotive industry, is to use stronger, lightweight materials to achieve lower weight and increased performance. Accordingly, there is a need for a tool that facilitates forming attachment pads in high strength steel sheet materials.

SUMMARY

The present invention provides improved apparatus and methods for forming attachment pads in high strength steel sheet material to facilitate joining components. While the invention will be described in connection with certain embodiments, it will be understood that the invention is not limited to these embodiments. On the contrary, the invention includes all alternatives, modifications, and equivalents as may be included within the spirit and scope of the present disclosure. In one aspect, a tool for forming an attachment pad on a sheet material made from high strength steel, includes a housing, an anvil supported on the housing and defining a working axis, and a slide block supported on the housing for movement at least along the working axis of the anvil. A die block is supported on the housing opposite the slide block, and is movable in directions along the working axis. The die block cooperates with anvil to form the pad at a target location defined along the working axis.

The tool further includes a heating device supported for movement to and between first and second positions relative to the target location. In the first position, the heating device is adjacent to and aligned with the target location so that the target location can be heated with the heating device. In the second position, the heating device is displaced from the first position and away from the target location so that the attachment pad can be formed in the heated sheet material between the die block and the anvil.

In another aspect, a method of forming an attachment pad on a sheet material comprising high strength steel includes positioning a pad forming tool so that the sheet material is disposed between a die block and a slide block of the tool. A target location on the sheet material where the attachment pad is to be formed is heated with a heating device, and the forming tool is moved to contact the sheet material with the slide block. The attachment pad is then formed in the heated sheet material by moving the die block along a working axis toward an anvil of the tool.

The above and other objects and advantages of the present invention shall be made apparent from the accompanying drawings and the description thereof.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the invention.

DETAILED DESCRIPTION

Figure 1:
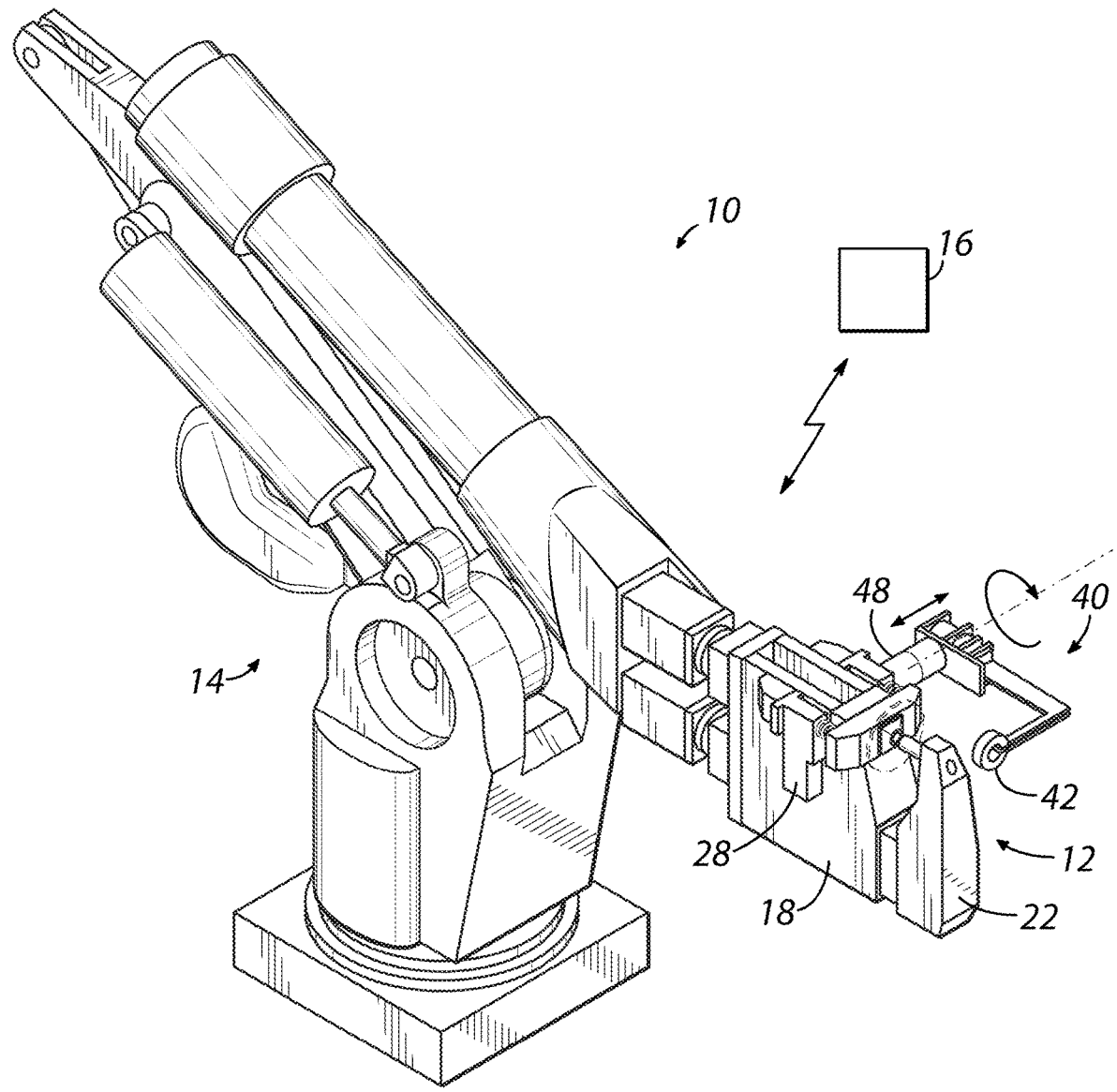
FIG. 1 is a perspective view of an exemplary system for forming attachment pads in high strength steel sheet material, including an exemplary pad forming tool in accordance with the principles of the present disclosure.

FIG. 1 depicts an exemplary system 10 for forming attachment pads in sheet material, including an exemplary pad forming tool 12 in accordance with the principles of the present disclosure supported by a multi-axis industrial robotic manipulator 14. The tool 12 shown and described herein is similar in many aspects to the pad forming tool disclosed in U.S. Pat. No. 7,117,706 to Savoy, which is incorporated by reference herein in its entirety. Operation of the robotic manipulator 14 and tool 12 may be controlled by one or more programmable controllers 16 associated with the robotic manipulator 14, the tool 12, or the system 10. Accordingly, the description of tool 12 herein focuses primarily on the differences that provide improved performance and operation of the tool 12 to form attachment pads in sheet material comprising high strength steel.

Figure 3:
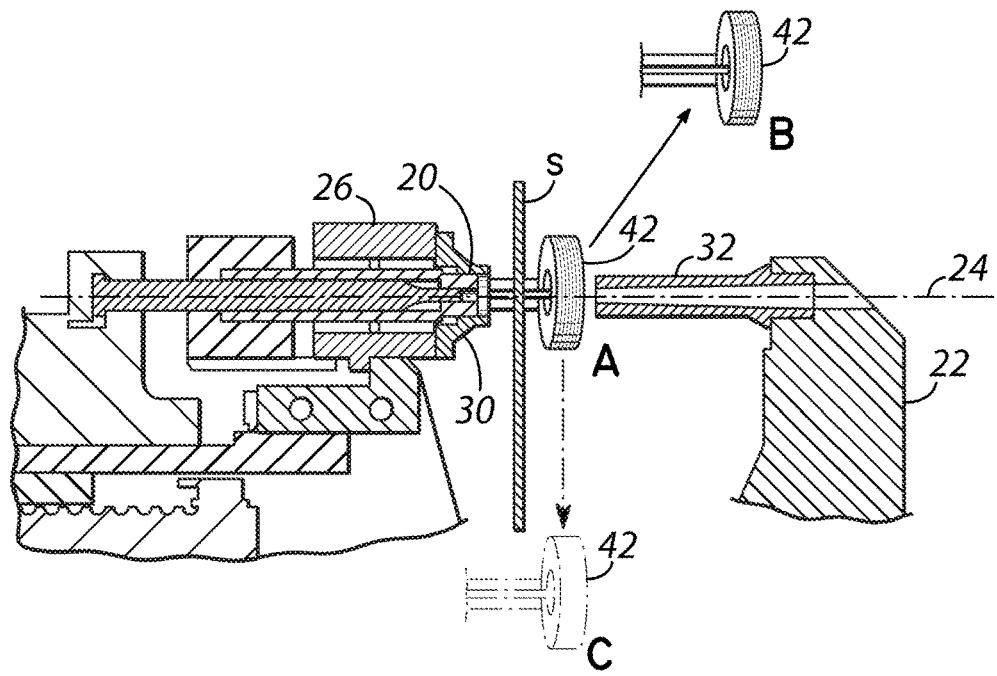
FIG. 3 is a schematic, cross-sectional illustration depicting positions of a heating device relative to other components of the pad forming tool.

Similar to the tool shown and described in U.S. Pat. No. 7,117,706, tool 12 includes a housing 18 for supporting the various components of the tool 12 and facilitating attachment of the tool 12 to the robotic manipulator 14. With reference to FIGS. 1 and 3, the housing 18 supports an anvil 20 against which the sheet material S is engaged and deformed by a die block 22 at a target location on the sheet material S to thereby form the attachment pad. The die block 22 is supported on the housing 18 and is slidably movable relative to the housing 18 in directions along a working axis 24 of the anvil 20 (see FIG. 3). The tool 12 further includes a slide block 26 positioned generally opposite the die block 22 and supported on the housing 18 for movement at least along the working axis 24 of the anvil 20. One or more actuators 28 carried on the housing 18 bias the slide block 26 in a direction toward the die block 22 for engagement with the sheet material S, as generally described in U.S. Pat. No. 7,117,706. In one embodiment, the actuators 28 may be operable in a first mode, wherein the slide block 26 may be moved toward and away from the die block 22, for example, during initial engagement with the sheet material S, and a second mode wherein the slide block 26 may be locked against movement in a direction away from the die block 22. In the locked, second mode of the actuators 28, the slide block 26 may cooperate with the die block 22 and the anvil 20 to form the pad.

In operation, the tool 12 is moved by the robotic manipulator 14 to a target location on the sheet material S where the attachment pad is to be formed. With the slide block 26 biased toward the die block 22, the robotic manipulator 14 then moves the tool 12 until a face plate 30 on the side block 26 makes initial contact with the sheet material S. Continued movement of the tool 12 toward the sheet material S moves the slide block 26 against the bias force of the actuators 28, in a direction away from the die block 22. Thereafter, the actuators 28 may be switched to the second mode, thereby locking the slide block 26 against further movement in a direction away from the die block 22. A first servomotor (not shown) supported by the housing 18 may then be actuated to move the die block 22 toward the anvil 20 and slide block 26 so that the sheet material S is engaged by a forming die 32 carried on the die block 22, and is deformed against the face plate 30 and the anvil 20 to thereby form the attachment pad at the target location.

In the embodiment shown, the pad forming tool 12 further includes a heating device 40 supported for movement to and between at least first and second positions relative to the target location. In the first position, illustrated in FIG. 3 with reference character A, the heating device 40 is positioned adjacent to and in line with the target location where the attachment pad will be formed in the high strength steel sheet material S. In this first position, the heating device may be activated to apply intense heat directly to sheet material S at the target location. In the second position, illustrated in FIG. 3 with reference character B, the heating device 40 is displaced away from the first position, and away from the target location on the sheet material S, so that the tool 12 may be actuated to form the attachment pad in the heated sheet material S, between the die block 22 and the anvil 20 as generally described in U.S. Pat. No. 7,117,706.

It will be appreciated that the heating device 40 can be actuated or moved in various ways to move the heating device 40 to and between the first and second positions, and that the second position of the heating device may be defined at various locations relative to the tool 12 that are suitable to facilitate operation of the tool 12 to form the attachment pad. As a non-limiting example, FIG. 3 depicts an alternative second position illustrated by reference character C, wherein the coil 42 is displaced a distance away from the target location sufficient to permit movement of the die block 22, slide block 26, and forming die 32 to form the attachment pad.

In the embodiment shown and described herein, the heating device 40 comprises an induction coil 42 coupled with a transformer. It will be appreciated however, that various other heating devices suitable for heating the target location on the sheet material S to an optimum thermal forming temperature may alternatively be used. As non-limiting examples, suitable heating devices may include devices configured to heat the target location using a laser, a flame, resistance heating, or a friction motion tool. In this regard, a friction motion tool for heating the target location may include devices or structure suitable for contacting one or both sides of the sheet material S at the target location, and causing relative movement between the tool and the sheet material S to generate heat at the target location. Moreover, while a single heating device 40 is shown herein for heating the target location on the sheet material S, it will be appreciated that multiple heating devices of the same or different types may be used to heat the target location prior to forming the attachment pad.

Figure 2:
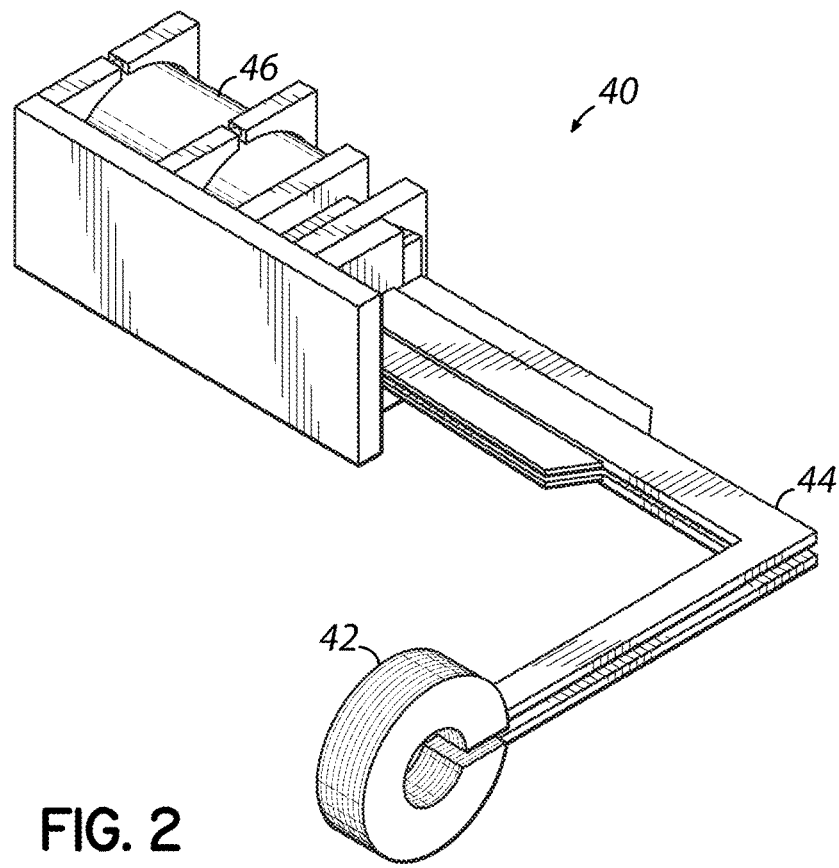
FIG. 2 is an enlarged detail view of the heating device of the exemplary pad forming tool of FIG. 1.

With continued reference to FIG. 2, the exemplary heating device 40 is depicted in more detail. In this embodiment, the coil 42 is supported at the end of a bus bar 44 that is coupled with a transformer 46, such as a Model No. 125 Flexible Output Transformer and a Sinac 12/18 kW single output power unit available from EFD Induction, Inc. of Madison Heights, Mich., for providing current to the coil 42. In general, the coil 42 may be custom configured as may be suitable for the particular application. For example, the coil 42 may be configured so that it has an effective frontal area facing the sheet material S that is larger than the largest attachment pad intended to be formed with the tool 12. In some embodiments, the coil 42 may be configured so that the effective frontal area of the coil 42 extends approximately 15 percent to approximately 20 percent beyond the area of the attachment pad to be formed. The extension of the heated area is dependent on the thickness and thermal ductility of the material being formed. In all forming process where a shape is drawn from a flat sheet, the material must stretch and flow from within and around the area itself to reduce thinning and tearing. While the coil 42 is shown and described herein as having a generally circular shape, it will be appreciated that induction coils for heating the target location of the sheet material S may alternatively have various other shapes as may be desired and generally corresponding to the shapes of the attachment pads to be formed.

The heating device 40, including the coil 42 and transformer 46 may be supported directly on the housing 18 of the tool 12, or may be supported at any other suitable location to facilitate movement of the coil 42 between the first and second positions. In the embodiment shown, the heating device 40 is supported on a link arm 48 coupled with the housing 18 and configured to pivot the coil 42 to and between the first and second positions. In other embodiments, the heating device may be supported in various other manners, and may be movable in various other ways between the first and second positions. In some embodiments, the heating device 40 may be supported adjacent the tool 12 by a separate support structure. For example, the heating device 40 may be supported adjacent the tool 12 by a separate robotic manipulator.

In use, a pad forming tool 12 as disclosed herein may be used to form an attachment pad in a sheet material S made from high strength steel. The pad forming tool 12 is positioned, for example by the robotic manipulator 14, such that the sheet material S is disposed between the die block 22 and the slide block 26 of the tool 12 at a target location on the sheet material S where the attachment pad is to be formed. The target location for forming the attachment pad on the sheet material S is then heated. In an exemplary embodiment, the target location on the sheet material S may be heated to a plastic formable state at a temperature of about 900 degrees Celsius within about 2.0 seconds. After heating the target location, the pad forming tool 12 is moved to contact the sheet material S with the slide block 26, and the pad is then formed by moving the die block 22 along the working axis 24 toward the anvil 20 of the tool 12. When the heating device 40 comprises an induction coil 42 as described herein, the method may further include positioning the heating device 40, including the induction coil 42, adjacent the target location on the sheet material S, and heating the target location by energizing the induction coil 42. In the first position of the heating device 40, the induction coil 42 is located very close to the sheet material S, without actually contacting the sheet material S so as to protect the coil insulation from thermal and wear degradation. In some embodiments the induction coil 42 may be located approximately 3 mm away from the sheet material S in the first position. As the coil 42 is positioned closer to the sheet material S, the induction process will be faster and more efficient. On the other hand, it is desirable to space the coil 42 a sufficient distance from the sheet material S to account for material location tolerances and automation (robotic) repeatability. In some embodiments, the coil may be located about 2 mm from the sheet material and the induction coil 42 may be energized for up to 1.5 seconds to heat the target location. Thereafter, the heating device 40, including the induction coil 42, may be moved away from the target location so that the attachment pad may be formed between the die block 22 and the anvil 20 as generally described in U.S. Pat. No. 7,117,706.

While the present invention has been illustrated by a description of various embodiments, and while these embodiments have been described in considerable detail, it is not intended to restrict or in any way limit the scope of the appended claims to such detail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

What is claimed is:

1. A tool for forming an attachment pad on a sheet material comprising high strength steel, the tool comprising:
    a housing;
    an anvil supported on the housing and defining a working axis for forming the pad;
    a slide block supported on the housing for movement at least along the working axis of the anvil;
    a die block supported on the housing opposite the slide block and movable in directions along the working axis, the die block cooperating with the anvil to form the pad at a target location defined along the working axis; and
    a heating device supported for selective independent movement during operation of the tool, to and between first and second positions relative to the target location;
    the first position being adjacent to and aligned with the target location;
    the second position displaced from the first position and away from the target location.

2. The tool of claim 1, wherein the heating device is supported on the tool.

3. The tool of claim 1, wherein the heating device is supported adjacent the tool by structure separate from the tool.

4. The tool of claim 1, wherein the heating device comprises at least one of:
    a laser;
    an induction coil;
    a burner configured to produce a flame;
    a resistance heating element; or
    a friction motion tool.

5. The tool of claim 4, wherein the heating device comprises an induction coil having an effective frontal area that is greater than the area of the attachment pad to be formed by about 15 percent to 20 percent.

6. A method of forming an attachment pad on a sheet material comprising high strength steel, the method comprising:
    positioning a pad forming tool such that the sheet material is disposed between a die block and a slide block of the tool;
    heating a target area on the sheet material where the attachment pad is to be formed;
    moving the forming tool to contact the sheet material with the slide block; and
    forming the pad by moving the die block along a working axis toward an anvil of the tool;
    positioning a heating device adjacent to and aligned with the target area; and
    independently moving the heating device during the performance of the method and away from the target area after heating the sheet material.

7. The method of claim 6, wherein:
    the heating device comprises an induction coil; and
    positioning the heating device adjacent the target area comprises positioning the induction coil within approximately 3 mm distance from the sheet material.

8. The method of claim 6, wherein:
    the heating device comprises an induction coil; and
    positioning the heating device adjacent the target area comprises positioning the induction coil within approximately 2 mm distance from the sheet material.

9. The method of claim 6, wherein heating the target area comprises energizing an induction coil for up to 2.0 seconds, inclusive.

10. The method of claim 6, wherein heating the target area comprises heating the sheet material to achieve a plastic formable state of the material.

11. A system for forming an attachment pad on a sheet material, the system comprising:
    a robotic manipulator; and
    a pad forming tool supported in the robotic manipulator, the pad forming tool comprising:
        a housing,
        an anvil supported on the housing and defining a working axis for forming the pad,
        a slide block supported on the housing for movement at least along the working axis of the anvil,
        a die block supported on the housing opposite the slide block and movable in directions along the working axis, the die block cooperating with the anvil to form the pad at a target location defined along the working axis, and
        a heating device supported for movement to and between first and second positions relative to the target location,
        the first position being adjacent to and aligned with the target location;
        the second position displaced from the first position and away from the target location.

* * * * *